3,083,090
PRODUCTION OF SINTER
William Davies, Sheffield, England, assignor to The United Steel Companies Limited, Sheffield, England
No Drawing. Filed Sept. 22, 1958, Ser. No. 762,215
10 Claims. (Cl. 75—5)

This invention relates to processes for the treatment of iron-bearing oxidic materials that include slag-forming constituents. These materials include oxidic ores or concentrates, millscale and oxidized metalliferous residues.

In the sintering of ores or the like, as generally understood, the material to be sintered and combustible matters are formed into a gas-permeable bed on a grate and air is drawn through the bed either upwards or downwards. The product is an oxidic product suitable for charging into a blast furnace, but not otherwise of value.

The main object of this invention is to produce a sintered product which can be used in steel-making, in that it is composed largely of metallic iron and can form all or part of the charge in a steel furnace, or if desired can be used in a blast furnace or cupola.

Another object is to sinter metallic oxides with fuel so as to reduce the oxides and to prevent reoxidation of the reduced metal.

In my invention I form the material and solid fuel into a bed on a grate and sinter the bed by drawing air with or without gaseous fuel through the bed while maintaining the maximum bed temperature between 1100 and 1500° C. I make the total amounts of fuel and air such that the greater part of the metallic oxides is reduced to metal, and I adjust the composition of the bed so that the slag matrix formed on sintering is fluid enough to envelope the liberated metal and prevent reoxidation.

The air may flow upwards or downwards through the bed and may be preheated. The preheating may be effected by the combustion of fuel, e.g. oil, gas or pulverized fuel, by the air before this enters the bed.

The greater part of the fuel is consumed in the reduction of the oxides. The remainder of the fuel is burnt by the air passing through the bed; the heat thus evolved and that in the preheated air provide the heat to complete the reduction and to convert the gangue constituents to a slag.

The maximum bed temperature must be controlled between 1100 and 1500° C. and preferably between 1200 and 1400° C. This can be done by varying the degree of preheat of the incoming air, the type, amount and distribution of the fuel and the composition of the gases drawn through the bed. Below 1200° C. some of the metal oxides may remain unreduced and above 1400° C. there is a tendency for higher oxides of iron present to be reduced only to FeO.

In general, if all the heat required is derived from the combustion of solid fuel, e.g. coke breeze, the proportion of solid fuel should be from 15 to 50% of the starting material by weight. However, some of the heat may be derived from the combustion of gaseous fuel such as coke oven gas or water gas burnt either in the bed or, as indicated above, in the air flowing to the bed.

To produce a sufficiently fluid slag the basicity of the gangue (or slag-forming) constituents should be adjusted so that the ratio of basic oxides to acidic oxides lies within the range of 1:1 and 5:1 and preferably between 1:1 and 3:1. Normally this ratio is less than 1:1 in the material under treatment. The adjustment may be effected by blending different ores, concentrates or the like but preferably by the addition of bases such as lime and magnesia in the form of either limestone or dolomite, burnt or unburnt. The addition of acidic oxides such as silica is not usually necessary as this is the common gangue constituent of most ores. With such materials as taconite concentrate reduction is facilitated as the proportion of calcium oxide is increased; at the same time, it may become more difficult to form a stable sinter owing to the development of $\gamma$-dicalcium silicate, which undergoes a 10% increase in volume when inverting to the $\beta$-form at 674° C., thereby causing the sinter to fall to a powder on cooling. If the sinter is not stable, the metallic iron will reoxidize. The $\gamma$-dicalcium silicate, may, however, be stabilized by the addition of a very small quantity of borax or other boron-containing compound, which should not amount to more than 0.5% of the weight of the calcium oxide present.

As in normal sintering practice, fines are produced and should be separated by screening. In carrying out the invention the process is continuous in that a travelling grate is used and the bed is formed on it continuously. The fines separated by screening may be mixed with fresh material and fuel to form the bed. Preferably the screen used is such that the returned fines form from 10 to 30% by weight of the metallic oxides in the bed.

Preferably the blended or adjusted materials forming the charge are mixed together and formed into small moist aggregates, which in turn are formed into a bed on the grate and ignited in the usual manner. The mixing and formation of the aggregates may be effected in a drum mixer. The fuel may be incorporated in the aggregates by being added to the mixer or may be fed separately to the grate in the formation of the bed. With such materials as taconite concentrate it is desirable to agglomerate all the ore or the like and most of the fuel together with lime. If agglomerates are formed by rolling the material in a drum, successive coatings in the manner of the skins of an onion may be built up by adding lime and then coke.

The agglomerates may advantageously be thinly coated with lime, which will bind any water condensed in the bed during the sintering and tending to cause the bed to collapse.

Since the reduced metal is magnetic, it is advantageous with sinter containing a high proportion of slag to crush the sinter and extract the metal as a concentrate by magnetic separation.

The invention may be applied to the production not only of iron but also of metallic ferro-manganese and similar ferrous materials.

Some examples will now be given.

*Example 1*

The bed had the following composition:

| | Parts by weight |
|---|---|
| Iron-bearing concentrates containing 64% Fe as $Fe_3O_4$ and 7% $SiO_2$ | 100 |
| Coke breeze | 40 |
| Dry hydrated lime | 30 |
| Moisture | 20 |
| Returned fines | 20 |
| Borax | 0.1 |

Taking into account the amount of basic oxides in the returned fines and siilca in the coke, the ratio of basic to acidic oxides is about 2.7:1.

The bed was ignited with town's gas, burnt at the rate of 4,000 B.t.u. per sq. ft. of bed area per minute, for 2 minutes. It was then sintered with air preheated to 400° C. by burning town's gas in the incoming air flow, which was drawn downwards through the grate at a rate of about 150 c.f./sq. ft./m. The maximum bed temperature was 1350° C. and 80% of the iron content in the product was present as metal.

Example 2

The bed had the following composition:

| | Parts by weight |
|---|---|
| Iron-bearing concentrates containing 64% Fe as $Fe_2O_3$ and 4.5% $SiO_2$ | 100 |
| Coke breeze | 40 |
| Dry hydrated lime | 15 |
| Returned fines | 20 |
| Borax | 0.05 |
| Moisture | 20 |

Taking into account the amount of basic oxides in the returned fines and silica in the coke, the ratio of basic to acidic oxides is about 1.9:1.

When the bed was sintered after ignition as in Example 1, with air drawn downwards through the grate at a rate of about 100 c.f./sq. ft./min., the maximum bed temperature was 1350° C. and 80% of the iron content was present as metal.

Example 3

The composition of the bed was:

| | Parts by weight |
|---|---|
| Iron-bearing mill-scale containing 70% Fe as $Fe_3O_4$ and 1% $SiO_2$ | 100 |
| Coke breeze | 30 |
| Dry hydrated lime | 5 |
| Returned fines | 10 |
| Borax | .025 |
| Moisture | 13 |

Taking into account the amount of basic oxides in the returned fines and silica in the coke, the ratio of basic to acidic oxides is about 1.7:1.

When the bed was sintered, after ignition as in Example 1, with air preheated as in Example 1 and drawn downwards through the grate at a rate of about 100 c.f./sq. ft./min., the maximum bed temperature was 1350° C. and 80% of the iron content was present as metal.

Example 4

The composition of the bed to be sintered was:

| | Parts by weight |
|---|---|
| Iron-bearing sintered ironstone fines containing 35% Fe as $Fe_3O_4$ and basic to acidic oxides in the ratio 1.2:1 | 100 |
| Coke breeze | 20 |
| Dry hydrated lime | 2 |
| Moisture | 10 |

The ratio of basic to acidic oxides is about 1.2:1.

When the bed was sintered, after ignition as in Example 1, with air drawn downwards through the grate at a rate of about 100 c.f./sq. ft./min., the maximum bed temperature was 1350° C. and 80% of the iron content was present as metal. This sinter was crushed to −100 mesh B.S.S. and separated to give a magnetic concentrate containing substantially all the metallic iron and a non-magnetic tailing containing substantially all the slag.

I claim:

1. In a process for treating an iron-bearing oxidic material that includes slag-forming constituents by forming the material and solid fuel into a bed on a traveling grate and sintering the charge by drawing air substantially perpendicularly through the bed, the steps which comprise adjusting the total amounts of fuel and air so that the greater part of the metallic oxides is reduced to metal, adjusting the composition of the bed so that the slag matrix formed on sintering is fluid enough to envelope the liberated metal and prevent reoxidation, and maintaining the maximum bed temperature between 1100 and 1500° C.

2. A process according to claim 1 in which the maximum bed temperature is from 1200 to 1400° C.

3. A process according to claim 1 in which all the fuel used is solid.

4. A process according to claim 1, in which the ratio of basic to acidic oxides in the bed is between 1:1 and 5:1.

5. A process according to claim 1 in which the material under treatment with any additions made for adjustment of the ratio of basic to acidic oxides is formed into small moist aggregates, which in turn are formed into the bed.

6. A continuous process according to claim 1 in which fines are separated from the sintered product and mixed with fresh material and fuel to form the bed.

7. A process according to claim 4 in which the material contains more acidic oxide than basic oxide and the ratio is adjusted by the addition of bases.

8. A process according to claim 4 in which the bed contains calcium oxide, and a small amount of a boron-containing compound is added in order to stabilise dicalcium silicate formed during the sintering.

9. A process according to claim 5 in which the agglomerates are thinly coated with lime.

10. A process according to claim 6 in which the returned fines form from 10 to 30% by weight of the metallic oxides in the charge.

References Cited in the file of this patent

UNITED STATES PATENTS

| 1,717,160 | Kichline | June 11, 1929 |
|---|---|---|
| 1,971,112 | Maier | Aug. 21, 1934 |
| 2,026,683 | Johannsen | Jan. 7, 1936 |
| 2,248,180 | Mariarty | July 8, 1941 |
| 2,445,377 | Wyckoff | July 20, 1948 |
| 2,450,343 | Howard et al. | Sept. 28, 1948 |
| 2,579,851 | Bowden | May 27, 1952 |
| 2,721,793 | Magri et al. | Oct. 25, 1955 |
| 2,811,434 | Moklebust | Oct. 29, 1957 |

FOREIGN PATENTS

| 573,539 | Great Britain | Nov. 26, 1945 |
|---|---|---|